United States Patent [19]

Denne et al.

[11] 4,114,151
[45] Sep. 12, 1978

[54] PASSIVE TRANSPONDER APPARATUS FOR USE IN AN INTERROGATOR-RESPONDER SYSTEM

[75] Inventors: Phillip Raymond Michael Denne, Broadstone; David Evan Naunton Davies, Hemel Hempstead; Colin Dougal McEwen, London, all of England

[73] Assignee: Alfa-Laval Company Limited, England

[21] Appl. No.: 723,621

[22] Filed: Sep. 14, 1976

[51] Int. Cl.² .............................................. G01S 9/56
[52] U.S. Cl. ........................... 343/6.8 LC; 343/6.5 R; 343/6.5 SS; 343/6.8 R
[58] Field of Search ............ 343/6.5 SS, 6.5 R, 6.8 R, 343/6.5 LC, 6.8 LC; 325/492

[56] References Cited

U.S. PATENT DOCUMENTS

| | | | |
|---|---|---|---|
| 3,098,971 | 7/1963 | Richardson | 325/492 |
| 3,377,616 | 4/1968 | Auer, Jr. | 343/6.5 SS |
| 3,754,250 | 8/1973 | Bruner | 343/6.8 R |
| 3,859,624 | 1/1975 | Kriofsky et al. | 343/6.5 SS |
| 3,893,111 | 7/1975 | Cotter | 343/6.5 R |
| 3,914,762 | 10/1975 | Klensch | 343/6.8 LC |
| 3,922,673 | 11/1975 | Bishop | 343/6.5 LC |

OTHER PUBLICATIONS

*Proceedings of the IEEE,* Aug. 1975, pp. 1260–1261, Koelle et al., "Short Range Radio-Telemetry ... Using Modulated RF Backscatter".

*Primary Examiner*—Richard A. Farley
*Assistant Examiner*—Lawrence Goodwin
*Attorney, Agent, or Firm*—Lawrence E. Laubscher

[57] ABSTRACT

A passive transponder for use in an interrogator-responder communication system is disclosed, including a first signal receiving element having a variable reflection property, a code signal generator for supplying a code signal, a modulating device responsive to the code signal for varying the signal reflection property of the first signal receiving element, and a power supply for supplying direct-current operating power to the code signal generator and to the modulating device, the power supply including a second signal receiving element for receiving a second electromagnetic signal having a second frequency different from the first frequency, and an a-c to d-c converter for converting the second signal to direct-current power.

12 Claims, 3 Drawing Figures

PASSIVE TRANSPONDER APPARATUS FOR USE IN AN INTERROGATOR-RESPONDER SYSTEM

BACKGROUND OF THE INVENTION

This invention relates to transponders and in particular transponders for transmitting coded data to an interrogating transmitter/receiver and to monitoring apparatus including such a transponder. Such a transponder finds use in vehicle identification, in remote sensing of information relating to animals and can be used for security purposes.

Transponders are known from a variety of applications which in response to an interrogation signal internally generate a signal for retransmission. Such transponders suffer in certain applications from the disadvantage that they require a relatively large power source for generating the reply signal. It is also known in connection with vehicle identification to place reflective strips which are read by scanning to enable the vehicle in question to be identified. Such systems generally require a relatively large area devoted to the coded reflective strips, which in certain applications are impracticable.

It has also been proposed to use the information carrying signal to power the transponder. This has the disadvantage that the power levels which must be transmitted to the transponder in order to operate it are high. This, in turn causes difficulties, especially when one is working with carrier signals at high frequencies since the transmitted power levels may be sufficient to cause injury to human beings or animals who pass through the beam of the carrier signal. This is a problem which many countries are tackling by limiting, or proposing to limit, the powers which can be transmitted at particular frequencies.

It is an object of the present invention to provide a transponder which will not suffer from the above disadvantages.

SUMMARY OF THE INVENTION

According to the present invention, there is provided a transponder including an element of which a reflection or transmission property for an electromagnetic signal at a first frequency may be varied and including means for applying a coded signal to the said element whereby when illuminated with energy of the said frequency the said element reflects or transmits energy with the same frequency but modulated in accordance with the coded signal, and means responsive to electromagnetic energy at a second frequency different to said first frequency for providing power for the transponder.

The present invention thus relies on altering the properties of a reflecting or transmitting element for which less power is likely to be required than for generating a reply signal. Preferably, the means for applying a coded signal comprises a source of signals at a third frequency, and means for modulating the first frequency signal with said signals at the third frequency. The second and third frequencies may be the same.

The wavelength of the electromagnetic signal at the first frequency may fall within the visible range, in which case a band of frequencies is reflected or transmitted. The element with electrically variable reflection or transmission coefficient may be a liquid crystal cell.

Preferably, however, in order to avoid problems which might be caused in an optical system by air turbulence, dust, grease etcl., the electromagnetic signal at the first frequency is a radio frequency signal of short wavelength, e.g. a microwave signal.

When using a microwave signal to illuminate the transponder the element with variable reflection coefficient may conveniently be an antenna or plurality of antenna of which the dimensions are comparable with the wavelength of the illuminating microwave signal. Each antenna element is connected to a device, such as a diode, of which the impedance may be electrically controlled.

The d.c. power for operating the transponder is derived from means responsive to electromagnetic energy at a second frequency different to said first frequency. For example, when using a microwave signal, said means may be a solar cell in which case a band of frequencies is utilized, but preferably the power is derived by electromagnetic induction from a transmitter using coils.

A synchronization signal may be sent to or emitted by a transponder to assist in recognition of the coded signal. If power is derived in the transducer by induction, the induced signal may itself serve as a synchronization signal. The transponder and integrating apparatus are relatively movable and although the interrogating apparatus is preferably stationary, it can be portable.

BRIEF DESCRIPTION OF THE DRAWING

In order that the present invention be more clearly understood, embodiments thereof will now be described by way of example, with reference to the accompanying drawings, in which.

DETAILED DESCRIPTION

Figure 1:
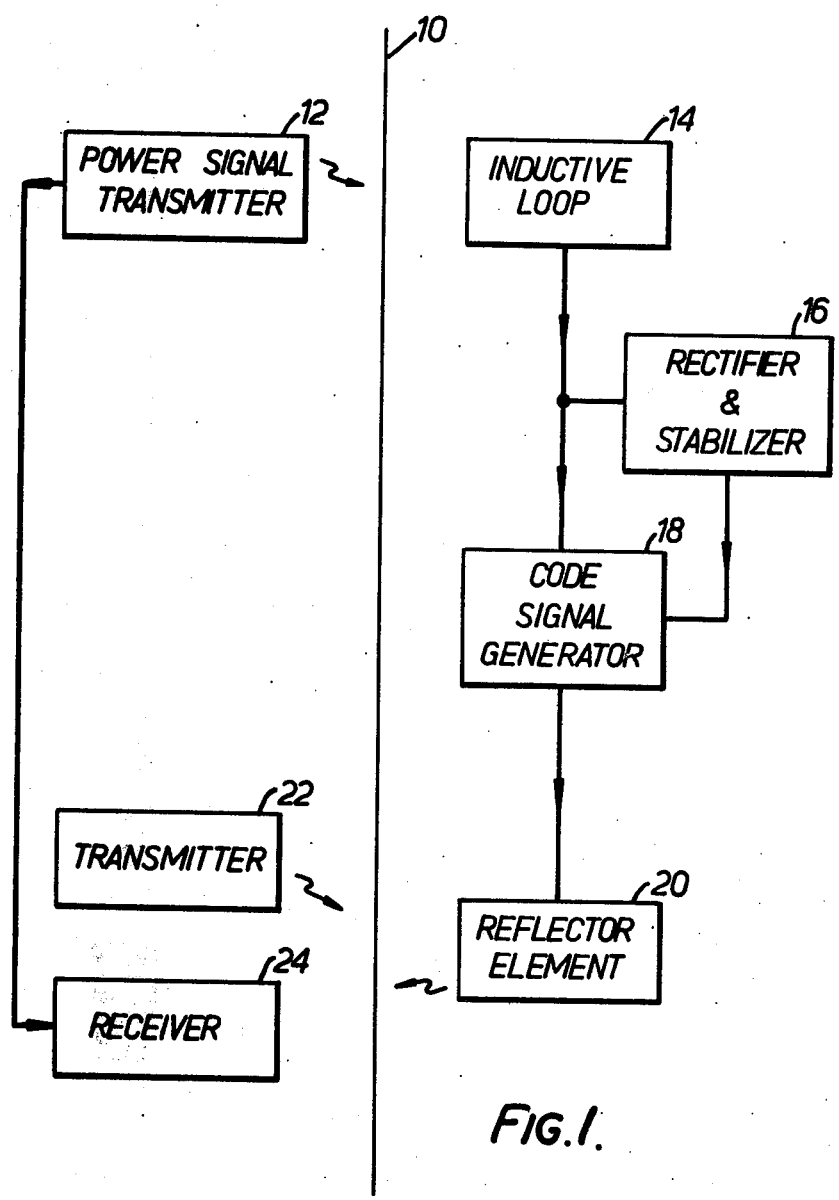
FIG. 1 is a block circuit diagram of an identification circuit incorporating a transponder in accordance with the invention.

The elements of the transponder are shown to the right of a line 10 in FIG. 1, the elements to the left of the line 10 constituting the interrogating equipment. Two signals are transmitted from the interrogating equipment to the transponder. The first signal is from a power signal transmitter 12 and is received by an inductive loop 14 in the mobile transponder. The transmitted signal is of sufficient power when received and rectified by a rectifier and stabilizer 16 to meet the averaged d.c. power requirements of the remaining elements of the transponder. It has been found that a transmitted powering signal 10 KHz is suitable. The signal from the inductive loop 14 is fed directly to a code signal generator 18 which generates a code representative of data to be transmitted to the stationary equipment. This code signal is applied to a reflective element 20 whose reflection coefficient is varied by the applied coded signal.

A second transmitter 22 in the interrogating equipment illuminates the reflective element 20 with radiation of a predetermined wavelength and a receiver 24 is tuned to receive radiation of the same wavelength after reflection by the reflective element 20. The receiver receives a synchronization signal from the power signal transmitter 12 to assist in decoding the received amplitude modulated reflected radiation.

In an optical system operating in accordance with the invention, the reflective element 20 in the transponder may be constituted by a liquid crystal cell. For example, a liquid crystal cell may be interposed between the radiation received from the transmitter 22 and a mirror so that the amount of light reflected will depend on the clarity of the liquid crystal material. Alternatively, if polarized light is used the modulating element may be one which causes the degree of polarization of light passing through it to be varied.

It should be noted that the transponder does not transmit a signal but merely modifies incoming radiation. Thus, in the absence of external illumination, the transponder would not be visible.

Though the d.c. power for driving the coded signal generator 18 has been described as being obtained by induction, it would be alternatively possible to substitute a solar cell within the transponder.

Though transponders in accordance with the invention may make use of wavelengths in the visible spectrum, there are several types of environment in which optical transponders are unsuitable in particular in atmospheres where the path of the interrogating beam is likely to be greatly obscured by dust, or to vapour, air turbulences etc., and also in environments where the transmitter, receiver or reflective element is likely to be coated with particles of dust or grease. It may sometimes be necessary for the transponder to be invisible either for purposes of secrecy in security systems or because the transponder is to be inserted beneath the skin or in other optically inaccessible regions of an animal. Likewise, where transponders are likely to be applied to vehicles, it may be necessary to mount the transponders beneath an opaque protecting skin to avoid mechanical damage.

The reflective element 20 may therefore be designed for operation at microwave frequencies and in particular in the frequency range from about 1 GHz up to the near infra-red. An microwave reflective element may be conceived to act either by changing the impedance to which a microwave aerial is connected, for example a microwave diode, or, equivalently, by mixing with the microwave radiation signal a modulation signal at a third frequency related to the transponder code, this mixing being due to the non-linear characteristics of a semiconductor diode. In this case, the reflective element is constituted by the combination of the microwave aerial and the semiconductor diode, the latter serving to vary the reflection coefficient of the reflective element. The degree of absorption or reflection of radiation incident upon the aerial is varied in accordance with the degree of match or mismatch of the aerial terminating impedance constituted by the microwave diode.

An advantage of the circuit contemplated for use at microwave frequencies is that it may be realized using circuit components already developed in connection with other applications. For example, the microwave transmitter and receiver are already commercially available as a simple burglar alarm Doppler radar device and can be purchased relatively cheaply. Likewise, the coded signal generator 18 within the transponder has also been developed and is commercially available for vehicle identification equipment.

In the system described, the frequency of the powering loop is used either directly or as multiple or submultiple within the transponder to synchronize the receiver and transmitter sections of the transponder system. By this means a very considerable increase in detector efficiency is obtained and the signal to noise ratio is thereby increased. It is to be mentioned, however, that it is not essential that the frequency of the powering loop be used to synchronise the transponder with the stationary receiver since it would be alternatively possible for the transponder to incorporate a free-running oscillator onto the frequency of which the receiver code-detector is locked by a conventional phase locked loop.

It is preferable that the modulating element should not be controlled by a device giving an output pulse equal in length to the code bit but by an a.c. signal which indicates whether the code bit is a "one" or a "zero". The advantage of using a.c. modulating current in the microwave diode is that the receiver code detector is able to determine clearly the start and stop times of each code pulse from the predetermined relationships between (i) the number of modulating cycles per bit (fractional whole or multiple)

(ii) the form of modulation (phase shift, frequency shift, amplitude or combination) and (iii) the phase of the modulating signal to which a bit edge may be locked.

In order to reduce the overall power requirements when power is coupled inductively into the transponder, it is possible for the transponder to include an energy reservoir such as a capacitor in which energy accumulates gradually but is discharged more rapidly to transmit bursts of code signals to the element of variable reflection or transmission coefficient. In such a system it is necessary for the capacitor to be of sufficient charge to transmit several continuous cycles of code pulses during each discharge.

In order to speed up the transfer of information between the transponder and the interrogating system, it is possible for the variable element to be simultaneously modulated in different ways on several frequencies each of which may correspond to a binary bit. For example, eight modulating frequencies, preferably chosen to be locked to the fundamental synchronizing frequency of the transponder system, may be used to present an eight bit word of digital coding simultaneously to the receiving section of the transponder system. A number of eight bit words presented in sequence by the above method are used to transfer a large transponder code rapidly. By a modification of this technique, the modulating frequencies mentioned above can be used sequentially for a number of words. For example, the first word may be modulated at frequency F1, the second word at frequency F2, and so on. All these words can be presented bit-sequentially, word parallel.

Finally, though as so far described the code signal generator 18 is assumed to transmit a predetermined code, it is alternatively possible for the code signal generator 18 to be connected to sensors; the transmitted code of the code bit rate, or the value of modulation frequency applied to the variable element or the degree of modulation thus being varied in dependence upon sensed parameters. Such a telemetry system finds use, for example, in monitoring the skin temperatures of animals, the sensors being thermistors or other temperature sensitive devices. In this latter embodiment, it is not essential that all the code be varied in accordance with the sensed parameter since, for example, the code may be divided into two sections the first fixed and representative of the identity of the animal and the second variable and representative of the skin temperature.

The code can be a function of the powering frequency or else a frequency-sensitive element may be incorporated such that the transponder responds to interrogation only when supplied with power at a predetermined frequency or set of frequencies.

Figure 2:
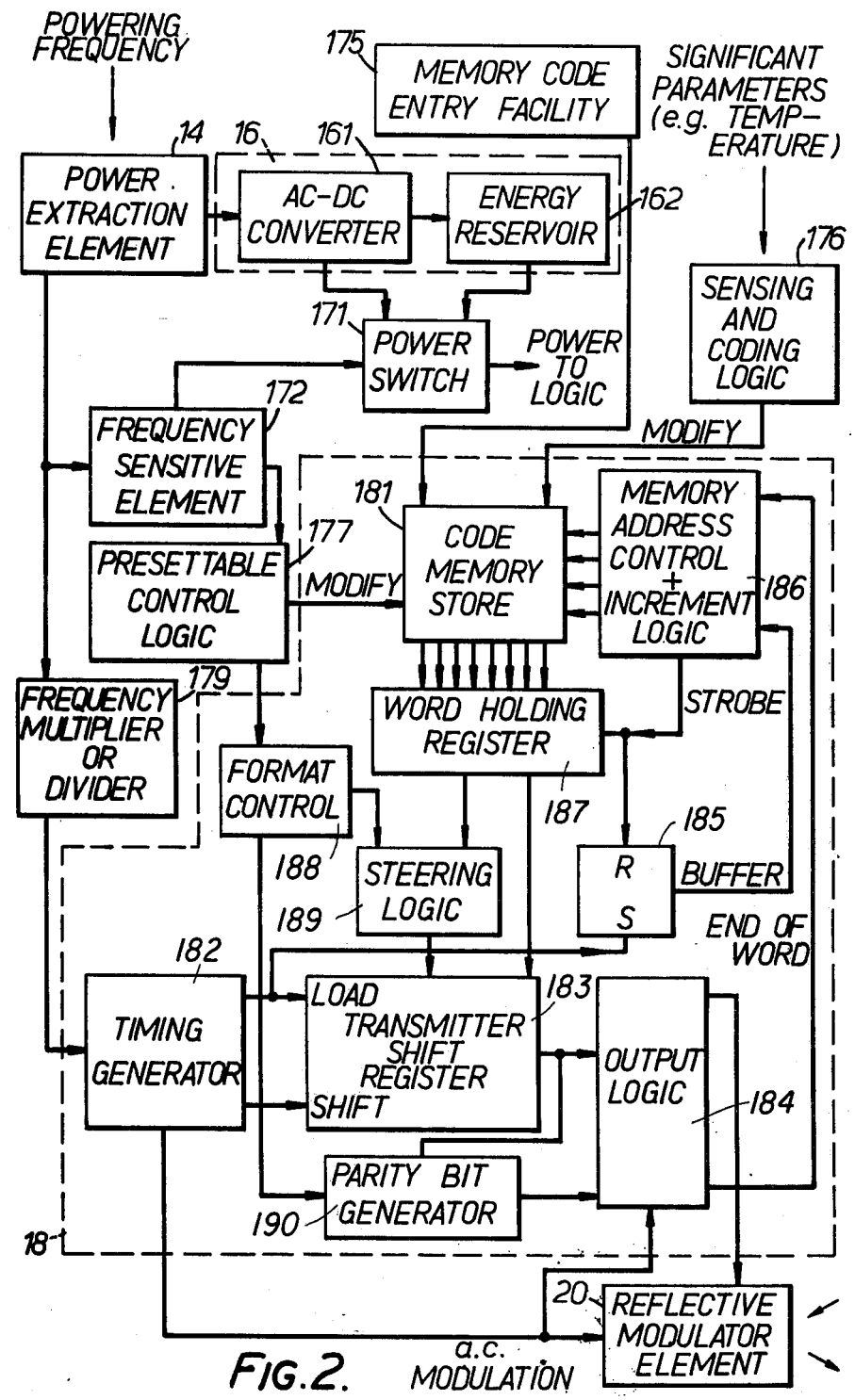
FIG. 2 is a more detailed block diagram of the transponder of FIG. 1.

The preferred form of the transponder is shown in FIG. 2 and the blocks shown in FIG. 1 are represented by broken lines. It is believed that in view of the foregoing description a detailed description of the transponder will not be necessary for those skilled in the art to understand its operation. However, a brief description will be given.

As described above, the transponder is a passive transponder and is preferably powered by electromagnetic induction. The rectifier and stabilizer 16 is shown as including an AC to DC converter 161 and an optional energy reservoir 162. The energy reservoir preferably is a capacitor but could be a capacitor or rechargeable-battery or other electrochemical charge storage device in conjunction with a solar cell. This arrangement is part passive, part active and is particularly useful when the transponder is used for animal identification or monitoring where the animal is out of doors for a large part of its life.

The rectifier and stabilizer 16 can either supply power directly to the rest of the transponder or, as shown, a switch 171 can be interposed in the system. The switch is controlled by a frequency sensitive device 172 so that power is not supplied to the rest of the transponder until a powering signal at the correct frequency is received. This can be used to advantage because the interrogating apparatus, which will be described in more detail later, is provided with a presence detector. An alarm signal can be generated by the interrogating apparatus if it detects the presence of a moving object but no code is reflected from the transponder, either because there is no transponder present or the transponder is not responsive to the appropriate powering frequency and so no power is supplied to the transponder and hence there is no modulation of the interrogating signal.

The code signal generator 18 is shown as comprising a code memory store 181 and transmitting apparatus. The transmitting apparatus shown is formed by a commercially available universal asynchronous transmitter and will therefore not be described in detail. Suffice to say it takes a word in parallel from the memory store 181 and transmits it to the reflector element 20 as a succession of serial bits.

The code memory store 181 can be any suitable store, for example, a read only memory, or, as shown a programmable read only memory (PROM). The store 181 if made as a PROM, is preferably of the type which will store codes for a long period of time and use very little power to do so. This can be achieved using NMOS technology.

The store 181 is shown as being programmable firstly through a code entry device 175 which writes the code or codes into the store 181. This is usually done by the manufacturer and the code entry device may not form part of the transponder. The code produced at the output can be modified using either a sensing and coding logic device 176 or a presettable control 177 or both. The sensing and coding logic device 176 can be used to modify the code produced by the store 181 in accordance with any desired parameter details of which are to be sent to the interrogating apparatus. In the case of animal monitoring such a parameter could be the temperature of the animal. Alternatively, the device 176 could be used to give an indication of the frequency at which the transponder is being powered. This can be done using the presettable control 177 which is shown connected to the frequency sensitive device 172.

In some circumstances therefore a store in the commonly accepted use of the word is not required. All that is needed is a device capable of distinguishing between a plurality of different frequencies and for modulating the reflector element 20 in accordance with each frequency. The powering frequency itself thus acts as a code.

An additional alternative is that instead of the device 176 altering the code, it could be used to alter the frequency of the modulating signal at the third frequency applied to the reflector element 20. Differences in modulating frequency could then be detected at the interrogating apparatus using phase-lock loop techniques.

As shown in FIG. 2, the rate at which bits of the code are transmitted to the reflector element 20 is locked to the powering frequency which in this case is 10 KHz. This is done using a frequency multiplier or divider 179 the output of which is connected with a timing generator 182 to provide timing signals to the transmitter shift register 183, the reflective modulator element 20, the output logic means 184, and one input terminal of the buffer store 185 that provides an end of word signal to the memory address control and increment logic means 186. The memory address control and increment logic means includes a plurality of first output terminals connected with the code memory store 181, and a strobe output terminal connected with the word holding register 187 and to the other input of the buffer store 185. The presettable control logic 177 supplies a signal to the format control means 188 that in turn supplies format control signals to the steering logic means 189 and to the parity bit generator 190. One output terminal of the parity bit generator is connected directly with the output logic 184, and another output terminal is connected with the connection between the output terminal of the transmitter shift register 183 and the corresponding input terminal of the output logic 184. The output terminals of the output logic 184 are connected with the reflective modulator element 20 and with the memory address control and increment logic means 186, respectively. The reflector element 20 is modulated by an a.c. signal at a frequency which is a multiple or submultiple or the same as the powering frequency, the a.c. signal being itself modulated by the code transmitted from the store 181. The a.c. signal can either be applied to the reflector element 20 in bursts according to the code, or the phase of the a.c. signal can be altered according to the code, or the value of the frequency (Hz) can be altered according to the code, or a combination of such techniques may be used. Locking the bit-rate to the powering frequency improves the ease of signal detection at the receiver but such locking is not essential as similar effects can be achieved using phase-lock techniques to a transponder determined modulator frequency as referred to in the preceding paragraph.

Figure 3:
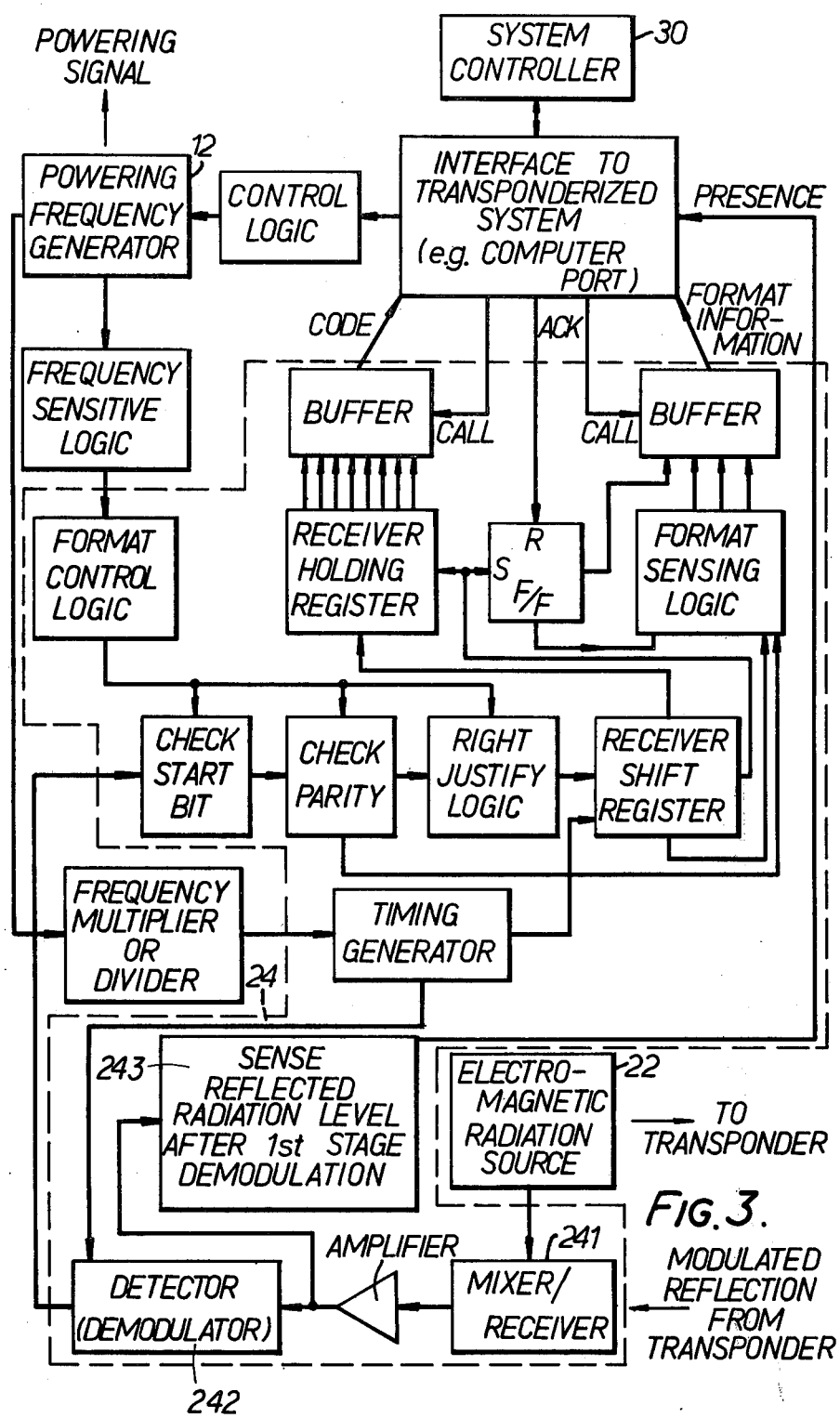
FIG. 3 is a more detailed block diagram of the interrogator of FIG. 1.

An interrogating apparatus for use with the transponder shown in FIG. 2 will now be described briefly. As mentioned with reference to FIG. 1, the interrogating apparatus comprises a powering transmitter 12 operating at 10 KHz, an interrogating signal transmitter 22 which in this case is a microwave transmitter 22 operating at 10.6 GHz and a receiver 24 shown in broken lines in FIG. 3. The receiver 24 is synchronized to the powering frequency.

Due to the low frequency inductive system which is preferably used, the transponder must be held close to the powering loop but this is no great problem in security applications where the loop is usually adjacent doorways or other openings through which personnel must pass or in animal monitoring applications where the animal or that part which carried the transponder can be put through a portal which includes the powering loop.

Turning now to the receiver 24, this includes a microwave carrier signal mixer/receiver 241 which with the transmitter 22 forms part of a commercially available intruder alarm and will therefore not be described in more detail. The output from the mixer/receiver 241 is at the third frequency and is amplified and fed to a further demodulator 242 which extracts the code.

The output from the mixer/receiver 241 is also fed to the presence detector 243 as previously mentioned. The remainder of the receiver is constituted by a commercially available universal asynchronous receiver and therefore will not be described in more detail.

The output from the receiver 24 is fed to a system controller 30 which can be used to record details of animals or control access to restricted areas in a security system.

Although the transponder has been described above in animal monitoring and security systems applications, it is of general use.

One of the presently preferred uses of the above transponder is for animal monitoring for example for identifying a cow when it enters a milking-parlour or stall in a parlour and for feeding that cow a ration of feed computed on the basis of past or future milk yield. The transponder can be provided under the skin of the animal or it can be attached to an ear of the animal or round its neck. In the latter two cases the transponder is protected by being encased in a protective material which is transparent to electromagnetic signals at the first frequency.

What we claim is:

1. Passive transponder apparatus adapted for use in an interrogator-resistor communication system, comprising
    (a) signal receiving means including a first signal receiving element (20) for receiving a first electromagnetic signal having a given first frequency, said first signal receiving element having a variable electromagnetic signal reflective property at said first frequency;
    (b) code signal generating means (18) for supplying a code signal, said code signal generating means including
        (1) a memory (181) for storing encoded information; and
        (2) means (172, 177) for modifying the code in said memory;
    (c) modulating means responsive to said code signal for varying the signal reflection property of said first signal receiving element; and
    (d) power supply means for supplying direct-current operating power to said code signal generating means and to said modulating means, including
        (1) second signal receiving means (14) for receiving a second electromagnetic signal having a second frequency different from said first frequency; and
        (2) converter means (161) for converting said second signal to direct-current power;
    (e) said code modifying means being responsive to the electromagnetic energy at said second frequency for modifying the code in accordance with said second frequency.

2. An interrogator-responder communication system for monitoring from an interrogating station information relating to a condition at a transponder station, comprising
    (a) first (22) and second (12) transmitters arranged at the interrogating station for directing first and second electromagnetic signals at different frequencies toward the transponder station;
    (b) receiver means (24) arranged at the interrogating station; and
    (c) passive transponder means arranged at the transponder station, said passive transponder means including
        (1) signal receiving means including a first signal receiving element (20) for reflecting said first electromagnetic signal to said receiver means, said first signal receiving element having a variable electromagnetic signal reflective property at said first frequency;
        (2) code signal generating means (18) for supplying a code signal to said first signal receiving means;
        (3) power supply means for supplying direct-current operating power to said code signal generating means and to said modulating means, including
            (a) second signal receiving means (14) for receiving a second electromagnetic signal having a second frequency different from said first frequency; and
            (b) converter means (161) for converting said second signal to direct-current power; and
        (4) modulating means responsive to said code signal for varying the signal reflection property of said first signal receiving element.

3. Apparatus as defined in claim 2, wherein said power supply means comprises a light sensitive device.

4. Apparatus as defined in claim 2, wherein said code applying means comprises a source of signals at a third frequency different from said first frequency, and means for modulating said first signal with said third frequency signal.

5. Apparatus as defined in claim 4, and further including means for altering the phase of the third frequency signals in accordance with said coded signal.

6. Apparatus as defined in claim 4, and further including means for altering the frequency of said third frequency signal in accordance with said coded signal.

7. Apparatus as defined in claim 4, and further including means for altering the amplitude of said third frequency signal in accordance with said coded signal.

8. Apparatus as defined in claim 4, wherein said modulating means includes frequency shift keying means for modulating said first frequency signal with bursts of said second frequency signal.

9. Apparatus as defined in claim 4, and further including means for deriving said third frequency signals from the electromagnetic energy of the second frequency signals.

10. Apparatus as defined in claim 2, and further including frequency-responsive means operable in response to said second frequency for controlling the operation of the transponder.

11. Apparatus as defined in claim 2, and further including memory means for storing encoded information, and means for modifying the code in said memory means.

12. Apparatus as defined in claim 2, wherein the frequencies of said first and second signals are inside and outside the microwave range, respectively.

* * * * *